United States Patent
Deng et al.

(10) Patent No.: US 12,489,114 B2
(45) Date of Patent: Dec. 2, 2025

(54) NEGATIVE ELECTRODE MATERIAL, AND PREPARATION METHOD THEREFOR AND USE THEREOF

(71) Applicant: BTR NEW MATERIAL GROUP CO., LTD., Guangdong (CN)

(72) Inventors: Zhiqiang Deng, Guangdong (CN); Lijuan Qu, Guangdong (CN); Chunlei Pang, Guangdong (CN); Jianguo Ren, Guangdong (CN); Min Yue, Guangdong (CN); Xueqin He, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 787 days.

(21) Appl. No.: 17/286,016

(22) PCT Filed: Aug. 1, 2019

(86) PCT No.: PCT/CN2019/098884
§ 371 (c)(1),
(2) Date: Apr. 16, 2021

(87) PCT Pub. No.: WO2020/113982
PCT Pub. Date: Jun. 11, 2020

(65) Prior Publication Data
US 2021/0384510 A1 Dec. 9, 2021

(30) Foreign Application Priority Data
Dec. 7, 2018 (CN) .......................... 201811496263.0

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0471* (2013.01); *H01M 4/364* (2013.01);
(Continued)

(58) Field of Classification Search
CPC .. H01M 4/5825; H01M 4/0471; H01M 4/364; H01M 4/483; H01M 4/362;
(Continued)

(56) References Cited

U.S. PATENT DOCUMENTS

2005/0233213 A1   10/2005   Lee et al.
2013/0344392 A1*  12/2013   Huang .................. H01M 4/583
                                                  429/231.8

(Continued)

FOREIGN PATENT DOCUMENTS

CN   1667855    9/2005
CN   102214824  10/2011
(Continued)

OTHER PUBLICATIONS

Decision to Grant a Patent, received in corresponding application in Japan JP2020-572373, dated Jan. 19, 2023; with English translation.
(Continued)

*Primary Examiner* — Stephen J Yanchuk
(74) *Attorney, Agent, or Firm* — McCoy Russell LLP

(57) ABSTRACT

A negative electrode material includes a composite matrix material and a carbon coating coated on the composite matrix material. The composite matrix material includes lithium silicate, silicon oxide, an activator, and silicon embedded in the lithium silicate and the silicon oxide.

9 Claims, 1 Drawing Sheet

(51) Int. Cl.
  *H01M 4/36* (2006.01)
  *H01M 4/38* (2006.01)
  *H01M 4/48* (2010.01)
  *H01M 4/583* (2010.01)
  *H01M 10/0525* (2010.01)
  *H01M 4/02* (2006.01)

(52) U.S. Cl.
  CPC .......... *H01M 4/386* (2013.01); *H01M 4/483* (2013.01); *H01M 4/583* (2013.01); *H01M 10/0525* (2013.01); *H01M 2004/027* (2013.01)

(58) Field of Classification Search
  CPC .... H01M 4/1395; H01M 4/386; H01M 4/583; H01M 4/625
  See application file for complete search history.

(56) References Cited

U.S. PATENT DOCUMENTS

| | | | |
|---|---|---|---|
| 2017/0301915 A1 | 10/2017 | Matus et al. | |
| 2018/0261833 A1 | 9/2018 | Hirose et al. | |
| 2018/0287148 A1* | 10/2018 | Akira | H01M 4/36 |
| 2019/0044128 A1* | 2/2019 | Mckinney | H01M 4/587 |
| 2019/0237761 A1* | 8/2019 | Yan | H01M 4/131 |
| 2019/0319261 A1* | 10/2019 | Uchiyama | H01M 4/364 |
| 2019/0341602 A1* | 11/2019 | Matsuno | C01B 33/113 |
| 2020/0020932 A1* | 1/2020 | Asano | H01M 4/386 |

FOREIGN PATENT DOCUMENTS

| | | | | |
|---|---|---|---|---|
| CN | 104603993 | B | | 5/2015 |
| CN | 107210442 | A | | 9/2017 |
| CN | 107408682 | A | | 11/2017 |
| CN | 107534136 | | | 1/2018 |
| CN | 108232145 | | | 6/2018 |
| CN | 108269979 | | | 7/2018 |
| EP | 2372816 | | | 5/2011 |
| EP | 3136477 | | * | 1/2016 |
| EP | 3136477 | A1 | * | 3/2017 ........ H01M 10/0525 |
| JP | 2005259697 | | | 1/2010 |
| JP | 2014199753 | | | 5/2017 |
| JP | 2017204374 | | | 4/2020 |
| KR | 20050090219 | | | 9/2005 |
| KR | 20050090218 | | | 5/2006 |
| WO | 2016136180 | | | 9/2016 |
| WO | 2018101072 | | | 6/2018 |
| WO | WO-2018179969 | A1 | * | 10/2018 ............... H01B 1/18 |

OTHER PUBLICATIONS

Notification to Grant Patent Right for Invention received in Priority Application No. CN2018114962630, with English translation.
First Office Action received in corresponding application in Japan JP2020-572373, dated Nov. 15, 2021, with English translation.
First Office Action received in Priority Application No. CN2018114962630, with English translation.
Second Office Action, Notice of Reasons for Refusal, received in corresponding application in Japan JP2020-572373, dated Aug. 2, 2022, four pages.
Second Office Action received in Priority Application No. CN2018114962630, with English translation.
First search of priority application CN2018114962630, undated, one page.
First Office Action of Corresponding European application family; Sep. 8, 2021; five pages.
Supplementary European Search Report of Corresponding European application; Aug. 25, 2021; two pages.
First Office Action of Priority Application; Jan. 13, 2022; eight pages.
English Translation of Written Opinion of the International Searching Authority of WO2020113982; Nov. 1, 2019, five pages.
International Search Report for International Application No. PCT/CN2019/098884 mailed Nov. 1, 2019 (5 pages), including English Translation.
International Written Opinion for International Application No. PCT/CN2019/098884 mailed Nov. 1, 2019 (4 pages).

* cited by examiner

NEGATIVE ELECTRODE MATERIAL, AND PREPARATION METHOD THEREFOR AND USE THEREOF

This application is a National Stage Application of PCT/CN2019/098884, filed 1 Aug. 2019, which claims benefit of Serial No. 201811496263.0, filed 7 Dec. 2018 in China and which applications are incorporated herein by reference. To the extent appropriate, a claim of priority is made to each of the above-disclosed applications.

TECHNICAL FIELD

The present disclosure belongs to the field of battery material preparation, for example, relates to a negative electrode material, a preparation method therefor and use thereof.

BACKGROUND ART

As SONY Corporation introduced a commercial lithium ion battery in 1991, research on materials related to lithium ion batteries has been conducted vigorously. Due to the diversification of functional requirements on various products, the requirements on batteries are increasingly raised, especially energy-saving and low-emission electric vehicles (EVs) draw great attention and become a key point of automobile research and development, and higher requirements are put forward on the output power, energy density, safety, voltage and the like of lithium ion batteries. The property of lithium ion batteries depends on the property of key materials, thereby the development and research of novel lithium ion battery electrode materials are promoted.

At present, the negative electrode material of the lithium ion battery generally adopts industrialized graphite, while the theoretical capacity of graphite negative electrode is only 372 mAh/g, which is far from meeting the ever-increasing market demand. The silicon material is concerned because of its theoretical capacity of up to 4200 mAh/g, but it has poor cycle performance due to up to 300% of volume expansion, then it is restricted in market popularization and application. The silica material has high specific capacity and good cycle performance, but the first coulombic efficiency of the silica material is low.

CN104603993B discloses a nonaqueous electrolyte secondary negative electrode active substance and a nonaqueous electrolyte secondary battery using the negative electrode active substance, wherein the negative electrode active substance contains $SiO_x$ particles of lithium silicate phase, 50%~100% of the surfaces of the $SiO_x$ particles are covered with carbon, and the average particle size of the $SiO_x$ particles is 1 μm~15 μm. Compared with a pure silica material negative electrode, the negative electrode material has significantly improved first coulombic efficiency, but lithium silicate contained in the negative electrode active substance is an electrochemical inert component, so that the reversible capacity of the material is reduced.

Therefore, there is a need in the art to develop a negative electrode material, and to make the prepared negative electrode material have high specific capacity, high first coulombic efficiency and good cycle stability.

SUMMARY

The following is a summary of the subject matter described in detail herein. The present summary is not intended to limit the scope of protection of the claims.

A first objective of the present disclosure is to provide a negative electrode material, which includes a composite matrix material and a carbon coating coated on the composite matrix material.

The composite matrix material includes lithium silicate, an oxide of silicon, an activator and silicon embedded in the lithium silicate and the oxide of silicon.

Compared with a pure silica material, regarding the negative electrode material provided in the present disclosure, the lithium silicate in the composite matrix material may reduce the consumption of lithium separated from the positive electrode material when the silica material is charged for the first time, and further the first coulombic efficiency of the negative electrode material may be effectively improved. Meanwhile, embedding the silicon in the lithium silicate may relieve the problem of volume expansion of the silicon during charging and discharging.

The activator in the composite matrix material of the present disclosure, on one hand, may improve the conductivity of the material, and further enhance the electrochemical property of the negative electrode material; on the other hand, the activator may serve as a support framework to improve the crystal structure of lithium silicate, so that lithium ions have a sufficient space to be separated from and embedded into the structure, and further show certain reversible capacity, thus further improving the first coulombic efficiency of the negative electrode material, wherein the first coulombic efficiency is no less than 83.6%.

The lithium silicate in the present disclosure is different from the lithium silicate prepared in the prior art. In the prior art, lithium silicate generated by the silicon negative electrode is a chemical inert component. The lithium silicate in the present disclosure has the capability of storing lithium ions and removing lithium ions due to the effect of activator, has good electrochemical activity, may further improve the capacity of the negative electrode material, and has the first discharging specific capacity of no less than 1263 mAh/g.

The carbon coating outside the composite matrix material of the present disclosure, on the one hand, may further improve the conductivity of the material and make the capacity of the negative electrode material sufficiently exert, on the other hand, may further alleviate the problem of volume expansion of silicon and silicon oxide in the charging and discharging process, so that the negative electrode material has good cycle stability, and 50-cycle capacity retention rate is no less than 82% at 0.1 C current density.

Optionally, the activator includes any one or a combination of at least two of an alkali metal, a transition metal, an alkali metal oxide and a transition metal oxide, and optionally any one or a combination of at least two of potassium, magnesium, aluminum, potassium oxide, magnesium oxide and aluminum oxide.

The activator selected in the present disclosure is a metal element having an atomic radius larger than Li or an oxide of a metal element having an atomic radius larger than Li.

Optionally, the content of the lithium silicate is 30 wt %~70 wt %, for example, 35 wt %, 40 wt %, 45 wt %, 50 wt %, 55 wt %, 60 wt %, and 65 wt %.

Optionally, the content of the oxide of silicon is 1 wt %~13 wt %, for example, 2 wt %, 3 wt %, 4 wt %, 5 wt %, 6 wt %, 7 wt %, 8 wt %, 9 wt %, 10 wt %, 11 wt %, and 12 wt %.

Optionally, the content of the carbon is 0.05 wt %~25 wt %, for example, 1 wt %, 3 wt %, 5 wt %, 8 wt %, 10 wt %, 12 wt %, 15 wt %, 18 wt %, 20 wt %, and 22 wt %.

Optionally, the content of the activator is 1 wt %~10 wt %, for example, 2 wt %, 4 wt %, 5 wt %, 6 wt %, 8 wt %, and 9 wt %.

Optionally, the content of the silicon is 20 wt %~40 wt %, for example, 22 wt %, 24 wt %, 25 wt %, 26 wt %, 28 wt %, 30 wt %, 32 wt %, 35 wt %, and 38 wt %.

Optionally, the lithium silicate in the negative electrode material includes any one or a combination of at least two of lithium orthosilicate, lithium metasilicate, lithium disilicate and lithium pentasilicate.

Optionally, the molecular formula of the oxide of silicon is $SiO_x$, where x is a constant of 0.5~1.8, for example, 0.8, 1, 1.2, 1.5, and 1.7.

A second objective of the present disclosure is to provide a method for preparing a negative electrode material, which includes steps of:

(1) mixing an oxide of silicon containing carbon with a lithium source to obtain a raw material mixture;

(2) making the raw material mixture undergo primary sintering under a protective atmosphere or a vacuum condition, to obtain a sintered mixture;

(3) fusing the sintered mixture with an activator to obtain an activated precursor; and (4) making the activated precursor undergo secondary sintering under a protective atmosphere or a vacuum condition.

Optionally, a mass ratio of the sintered mixture to the activator in step (3) of the present disclosure is 5:1~30:1, for example, 8:1, 10:1, 12:1, 15:1, 18:1, 20:1, 22:1, 25:1, and 28:1.

Optionally, the temperature of the fusing is 100~300° C., for example 150° C., 200° C., 250° C., and 280° C.

Optionally, the duration of the fusing is 1 h~4 h, for example, 1.5 h, 2 h, 2.5 h, 3 h, and 3.5 h.

Optionally, the molar ratio of the oxide of silicon containing carbon to the lithium source in step (1) of the present disclosure is 2.5:1~9:1, for example 3:1, 4:1, 5:1, 6:1, 7:1, and 8:1.

Optionally, the molecular formula of the oxide of silicon containing carbon is $SiO_xC$, where x is a constant of 0.5~1.8, optionally SiOC, for example, 0.6, 0.8, 1, 1.2, 1.5, and 1.7.

Optionally, the lithium source includes any one or a combination of at least two of lithium metal, lithium carbonate, lithium hydroxide and lithium acetate.

Optionally, in step (2) of the present disclosure, the temperature of the primary sintering is 200~1000° C., optionally 500~900° C., for example, 300° C., 400° C., 500° C., 600° C., 700° C., 800° C., and 900° C.

Optionally, the duration of the primary sintering is 2 h~6 h, for example, 3 h, 3.5 h, 4 h, 4.5 h, and 5 h.

Optionally, the temperature of the secondary sintering in step (4) is 150~1000° C., optionally 300~900° C., for example, 200° C., 300° C., 400° C., 500° C., 600° C., 700° C., 800° C., and 900° C.

Optionally, the duration of the secondary sintering is 6 h~10 h, for example, 6.5 h, 7 h, 7.5 h, 8 h, and 9 h.

Optionally, the protective atmosphere includes any one or a combination of at least two of a nitrogen atmosphere, an argon atmosphere, a helium atmosphere, a neon atmosphere, a krypton atmosphere and a xenon atmosphere, for example, the nitrogen atmosphere, the argon atmosphere, and the helium atmosphere.

As an optional technical solution, the present disclosure provides a method for preparing a negative electrode material, which includes steps of:

(1) mixing SiOC and lithium hydroxide according to a molar ratio of 2.5:1~9:1 to obtain a raw material mixture;

(2) sintering the raw material mixture at 500~900° C. for 2 h~6 h under a protective atmosphere to obtain a sintered mixture;

(3) fusing the sintered mixture and Mg according to a mass ratio of 5:1~30:1 at a temperature of 100~300° C. for 1 h~4 h to obtain an activated precursor; and (4) sintering the activated precursor at 300~900° C. for 6 h~10 h under a protective atmosphere to obtain a negative electrode material.

A third objective of the present disclosure is to provide use of the negative electrode material according to the first objective, and the negative electrode material is used in the field of lithium ion batteries.

Optionally, the negative electrode material is used as negative electrode material of lithium ion batteries.

A fourth objective of the present disclosure is to provide a lithium ion battery, which includes the negative electrode material according to the first objective.

Optionally, the negative electrode material of the lithium ion battery is the negative electrode material according to the first objective.

Compared with the prior art, the present disclosure has following beneficial effects.

(1) Compared with a pure silica material, regarding the negative electrode material provided in the present disclosure, the lithium silicate in the composite matrix material may reduce the consumption of lithium separated from the positive electrode material when the silica material is charged for the first time, and further the first coulombic efficiency of the negative electrode material may be effectively improved. Meanwhile, embedding the silicon in the lithium silicate may relieve the problem of volume expansion of the silicon during charging and discharging.

(2) The lithium silicate in the present disclosure is different from the lithium silicate prepared in the prior art. In the prior art, lithium silicate generated by the silicon negative electrode is a chemical inert component. The lithium silicate in the present disclosure has the capability of storing lithium ions and removing lithium ions due to the effect of activator, has good electrochemical activity, may further improve the capacity of the negative electrode material, and has the first discharging specific capacity of no less than 1263 mAh/go.

(3) The activator in the composite matrix material of the present disclosure, on one hand, may improve the conductivity of the material, and further enhance the electrochemical property of the negative electrode material; on the other hand, the activator may serve as a support framework to improve the crystal structure of lithium silicate, so that lithium ions have a sufficient space to be separated from and embedded into the structure, and further show certain reversible capacity, thus further improving the first coulombic efficiency of the negative electrode material, wherein the first coulombic efficiency is no less than 83.6%.

(4) The carbon coating outside the composite matrix material of the present disclosure, on the one hand, may further improve the conductivity of the material and make the capacity of the negative electrode material sufficiently exert, on the other hand, may further alleviate the problem of volume expansion of silicon and silicon oxide in the charging and discharging process, so that the negative electrode material has good cycle stability, and 50-cycle capacity retention rate is no less than 82% at 0.1 C current density.

After reading and understanding the detailed description and accompanying drawings, other aspects may be understood.

DETAILED DESCRIPTION OF EMBODIMENTS

In order to facilitate understanding the present disclosure, examples listed in the present disclosure are as follows. Those skilled in the art should know that the examples are merely to help understand the present disclosure, but should not be considered as specific limitation to the present disclosure.

Example 1

Figure 1:
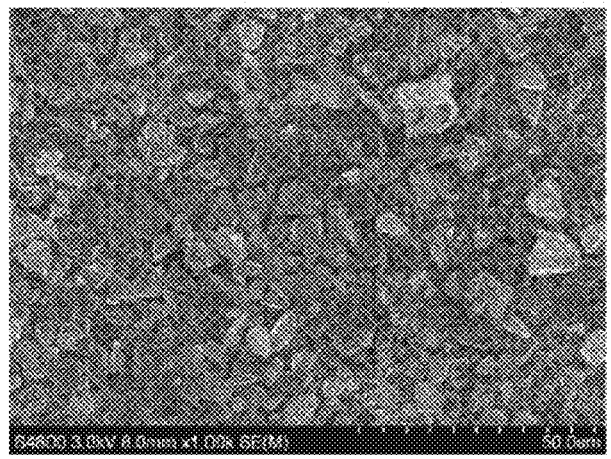
FIG. 1 is an SEM diagram of a sample obtained from Example 1 of the present disclosure.

A method for preparing a negative electrode material included steps of:
(1) mixing SiOC and lithium metal according to a molar ratio of 3:1 to obtain a raw material mixture;
(2) sintering the raw material mixture at 700° C. for 4 h under a protective atmosphere to obtain a sintered mixture;
(3) fusing the sintered mixture and Mg according to a mass ratio of 10:1 at a temperature of 180° C. for 2 h to obtain an activated precursor; and
(4) sintering the activated precursor at 750° C. for 8 h under a protective atmosphere to obtain a negative electrode material with a morphology feature as shown in FIG. 1, wherein it can be seen from the figure that the negative electrode material obtained has a particle size of 5~10 μm, and has a carbon coating at the outermost layer.

Example 2

Different from Example 1, the molar ratio of the sintered mixture to Mg was 5:1 in step (3).

Example 3

Different from Example 1, the molar ratio of the sintered mixture to Mg was 30:1 in step (3).

Example 4

Different from Example 1, the molar ratio of the sintered mixture to Mg was 4:1 in step (3).

Example 5

Different from Example 1, the molar ratio of the sintered mixture to Mg was 31:1 in step (3).

Example 6

A method for preparing a negative electrode material included steps of:

(1) mixing $SiO_xC$ (x=0.5) and lithium hydroxide according to a molar ratio of 9:1 to obtain a raw material mixture;
(2) sintering the raw material mixture at 200° C. for 6 h under a nitrogen atmosphere to obtain a sintered mixture;
(3) fusing the sintered mixture and $K_2O$ according to a molar ratio of 5:1 at a temperature of 100° C. for 4 h to obtain an activated precursor; and
(4) sintering the activated precursor at 150° C. for 10 h under a nitrogen atmosphere to obtain a negative electrode material.

Example 7

Figure 2:
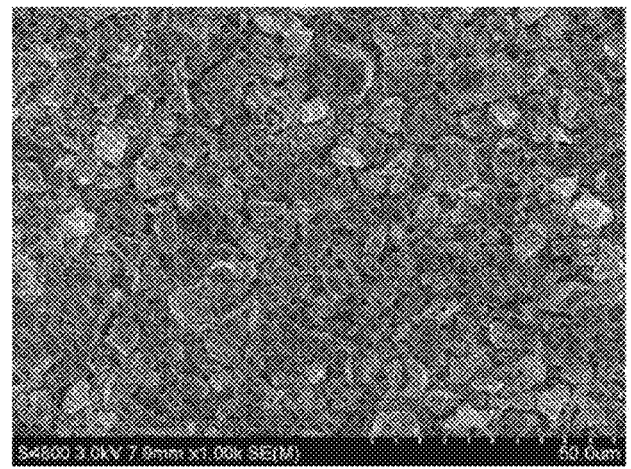
FIG. 2 isn a SEM diagram of a sample obtained from Example 7 of the present disclosure.

A method for preparing a negative electrode material included steps of:
(1) mixing $SiO_xC$ (x=1.8) and lithium metal according to a molar ratio of 2.5:1 to obtain a raw material mixture;
(2) sintering the raw material mixture at 1000° C. for 2 h under an argon atmosphere to obtain a sintered mixture;
(3) fusing the sintered mixture and Al according to a molar ratio of 30:1 at a temperature of 300° C. for 1 h to obtain an activated precursor; and
(4) sintering the activated precursor at 1000° C. for 6 h under an argon atmosphere to obtain a negative electrode material with a morphology feature as shown in FIG. 2, wherein it can be seen from the figure that the negative electrode material obtained has a particle size of 5~10 μm, and has a carbon coating at the outermost layer.

Comparative Example 1

Different from Example 1, no Mg was added in step (3).

Comparative Example 2

Different from Example 1, SiOC was replaced by $SiO_2$ in step (1).

Property Test:

The prepared negative electrode materials were subjected to the following property tests:
(1) Preparing a lithium ion battery: the prepared negative electrode material, conductive carbon black, CMC/SBR were coated on a copper foil at a ratio 75:15:10, to prepare a negative electrode sheet, a metal lithium sheet was used as a counter electrode, and PP/PE was used as a separator, to make a button battery.
(2) Testing first Coulombic efficiency: electrochemical property of the battery were tested using a LAND 5 V/10 mA type battery tester, wherein the charging and discharging voltage was 1.5 V, the charging and discharging rate was 0.1 C, and the first Coulombic efficiency=first charging specific capacity/first discharging specific capacity.
(3) Testing 50-cycle capacity retention ratio: the electrochemical property of the battery was tested using a LAND 5 V/10 mA type battery tester, wherein the charging and discharging voltage was 1.5 V, the charging and discharging rate was 0.1 C, and 50-cycle capacity retention ratio=the $50^{th}$ charging specific capacity/the first charging specific capacity.

TABLE 1

| | First Discharging Specific Capacity(mAh/g) | First Coulombic Efficiency(%) | 50-cycle Capacity Retention Ratio (%) |
|---|---|---|---|
| Example 1 | 1502 | 88.8 | 88.7 |
| Example 2 | 1430 | 88.7 | 88.2 |
| Example 3 | 1477 | 86.3 | 87.8 |
| Example 4 | 1399 | 83.6 | 82.0 |
| Example 5 | 1263 | 85.7 | 83.5 |
| Example 6 | 1463 | 85.1 | 85.3 |
| Example 7 | 1377 | 86.5 | 84.6 |
| Comparative Example 1 | 1105 | 74.1 | 71.6 |
| Comparative Example 2 | 1378 | 70.6 | 63.7 |

It can be seen from Table 1 that the lithium silicate in the negative electrode material prepared in Examples 1~7 of the present disclosure is an electrochemically active ingredient, and further the negative electrode material has good electrochemical property. The first discharging specific capacity is no less than 1263 mAh/g, the first Coulombic efficiency is no less than 83.6%, and 50-cycle capacity retention ratio is no less than 82% at 0.1 C current density.

It can be seen from Table 1 that, the first Coulombic efficiency and the 50-cycle capacity retention ratio of Example 4 are lower than those of Example 1, possibly because the addition amount of the activator Mg in Example 4 is too large, and the structure of lithium silicate is destroyed, so that the first discharging specific capacity, the first Coulombic efficiency and the 50-cycle capacity retention ratio of the negative electrode material prepared are low.

It can be seen from Table 1 that, the first discharging specific capacity, the first Coulombic efficiency and the 50-cycle capacity retention ratio of Example 5 are lower than those of Example 1, possibly because the addition amount of the activator Mg in Example 5 is too small, then the lithium silicate in the negative electrode material is not activated, so that the first discharging specific capacity, the first Coulombic efficiency and the 50-cycle capacity retention ratio of the negative electrode material prepared are low.

It can be seen from Table 1 that, the first discharging specific capacity, the first Coulombic efficiency and the 50-cycle capacity retention ratio of Comparative Example 1 are lower than those of Example 1, possibly because no activator Mg is added in Comparative Example 1, then the lithium silicate in the negative electrode material is a chemical inert component, so that the first discharging specific capacity, the first Coulombic efficiency and the 50-cycle capacity retention ratio of the negative electrode material prepared are low.

It can be seen from Table 1 that the first Coulombic efficiency and the 50-cycle capacity retention ratio of Comparative Example 2 are lower than those of Example 1, possibly because the silicon source in Comparative Example 2 is $SiO_2$, and there is no carbon coating in the negative electrode material prepared, so that the first Coulombic efficiency and the 50-cycle capacity retention ratio of the negative electrode material prepared are low.

The applicant states that the detailed process equipment and process flow of the present disclosure are illustrated through the above examples in the present disclosure, but the present disclosure is not limited to the above detailed process equipment and process flow, that is, it does not mean that the present disclosure must be implemented relying upon the detailed process equipment and process flow above.

What is claimed is:

1. A negative electrode material, wherein the negative electrode material comprises a composite matrix material and a carbon coating coated on the composite matrix material,
   wherein the composite matrix material comprises lithium silicate, an oxide of silicon, an activator and silicon, which is embedded in the lithium silicate and the oxide of silicon,
   wherein the lithium silicate accounts for 30 wt %-70 wt % of the negative electrode material before the negative electrode material is prepared into a lithium ion battery,
   wherein the activator is to activate the lithium silicate and comprises any one or a combination of at least two of potassium, magnesium, aluminum, potassium oxide, magnesium oxide and aluminum oxide.

2. A lithium ion battery, wherein the lithium ion battery comprises the negative electrode material according to claim 1.

3. A lithium ion battery, wherein the lithium ion battery comprises negative electrode material, wherein the negative electrode material of the lithium ion battery is the negative electrode material according to claim 1.

4. The negative electrode material according to claim 1, wherein the oxide of silicon accounts for 1 wt %-13 wt % of the negative electrode material.

5. The negative electrode material according to claim 1, wherein the carbon accounts for 0.05 wt %-25 wt % of the negative electrode material.

6. The negative electrode material according to claim 1, wherein the activator accounts for 1 wt %-10 wt % of the negative electrode material.

7. The negative electrode material according to claim 1, wherein the silicon accounts for 20 wt %-40 wt % of the negative electrode material.

8. The negative electrode material according to claim 1, wherein the lithium silicate comprises any one of lithium orthosilicate, lithium metasilicate, lithium disilicate and lithium pentasilicate or a combination of at least two therefrom.

9. The negative electrode material according to claim 1, wherein a molecular formula of the oxide of silicon is $SiO_x$, where x is a constant of 0.5-1.8.

* * * * *